United States Patent
Haslam et al.

(10) Patent No.: US 12,066,393 B1
(45) Date of Patent: Aug. 20, 2024

(54) MOISTURE DETECTION SYSTEM

(71) Applicant: UIPCO, LLC, San Antonio, TX (US)

(72) Inventors: Justin Dax Haslam, San Antonio, TX (US); Donnette Moncrief Brown, San Antonio, TX (US); Eric David Schroeder, San Antonio, TX (US); Ravi Durairaj, San Antonio, TX (US); Deborah Janette Schulz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 946 days.

(21) Appl. No.: 17/013,227

(22) Filed: Sep. 4, 2020

Related U.S. Application Data

(60) Provisional application No. 62/896,892, filed on Sep. 6, 2019.

(51) Int. Cl.
G01N 27/04 (2006.01)
E04F 19/04 (2006.01)
G05B 19/048 (2006.01)

(52) U.S. Cl.
CPC ........... *G01N 27/048* (2013.01); *E04F 19/04* (2013.01)

(58) Field of Classification Search
CPC ........ G05B 19/048; G05B 2219/24015; G05B 19/406; G05B 2219/37375; G01F 1/363
See application file for complete search history.

(56) References Cited

U.S. PATENT DOCUMENTS

| | | | | |
|---|---|---|---|---|
| 5,760,694 | A * | 6/1998 | Nissim | A61F 13/42 128/885 |
| 8,324,621 | B2 * | 12/2012 | Yamazaki | H01L 29/4908 257/43 |
| 2007/0131279 | A1 * | 6/2007 | Thakre | A61M 16/08 137/14 |
| 2009/0284382 | A1 * | 11/2009 | Hill | G01M 3/165 340/604 |
| 2011/0100328 | A1 * | 5/2011 | Paul | H01M 8/186 174/138 R |
| 2011/0109351 | A1 * | 5/2011 | Yamazaki | H01L 29/78678 257/E29.296 |
| 2017/0003693 | A1 * | 1/2017 | Baxter | G01F 15/066 |
| 2017/0294099 | A1 * | 10/2017 | Sequeira | G08B 21/10 |
| 2019/0258278 | A1 * | 8/2019 | Zokaei | G08B 25/10 |

* cited by examiner

*Primary Examiner* — Jermele M Hollington
*Assistant Examiner* — Temilade S Rhodes-Vivour
(74) *Attorney, Agent, or Firm* — Plumsea Law Group, LLC

(57) ABSTRACT

A moisture detection system may include a baseboard including a first electrode and a second electrode; and a moisture detector configured to detect whether a circuit is closed by a conductive liquid making simultaneous contact with the first electrode and the second electrode.

20 Claims, 7 Drawing Sheets

MOISTURE DETECTION SYSTEM

CROSS-REFERENCE TO RELATED APPLICATIONS

This application claims priority to Haslam et al., U.S. Provisional Patent Application No. 62/896,892, filed Sep. 6, 2019, and entitled "Moisture Detection System," the entire disclosure of which is incorporated herein by reference.

TECHNICAL FIELD

The present disclosure generally relates to a moisture detection system and, more particularly, to a baseboard moisture detection system.

BACKGROUND

A large proportion of non-catastrophe losses suffered by homeowners are related to water damage. Moisture sensors are generally configured to detect moisture in one location. However, if water does not reach the part of a wall where the moisture sensor is located, the sensor will not detect the water. This means that a significant amount of water will need to flood the room before the sensor will be tripped.

There is a need in the art for a system and method that addresses the shortcomings discussed above.

SUMMARY

In one aspect, the present disclosure is directed to a moisture detection system. The system may include a baseboard including a first electrode and a second electrode; and a moisture detector configured to detect whether a circuit is closed by a conductive liquid making simultaneous contact with the first electrode and the second electrode.

In another aspect, the present disclosure is directed to a baseboard for a moisture detection system. The baseboard may include a first electrode and a second electrode, wherein the first electrode and the second electrode extend along a length of the baseboard in a recess in a bottom of the baseboard, and wherein the first electrode and the second electrode are disposed within, and separated by, a moisture absorbing material within the recess.

In another aspect, the present disclosure is directed to a moisture detection system. The system may include a plurality of baseboards arranged about a room of a building, each baseboard including a first electrode and a second electrode; and at least one moisture detector configured to detect whether a circuit is closed by a conductive liquid making simultaneous contact with the first electrode and the second electrode.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to a baseboard moisture sensing system. The system includes electrodes that extend the length of each baseboard, wherein water closes a circuit across the electrodes. The closing of the circuit is detectible by a moisture detector device.

Figure 1:
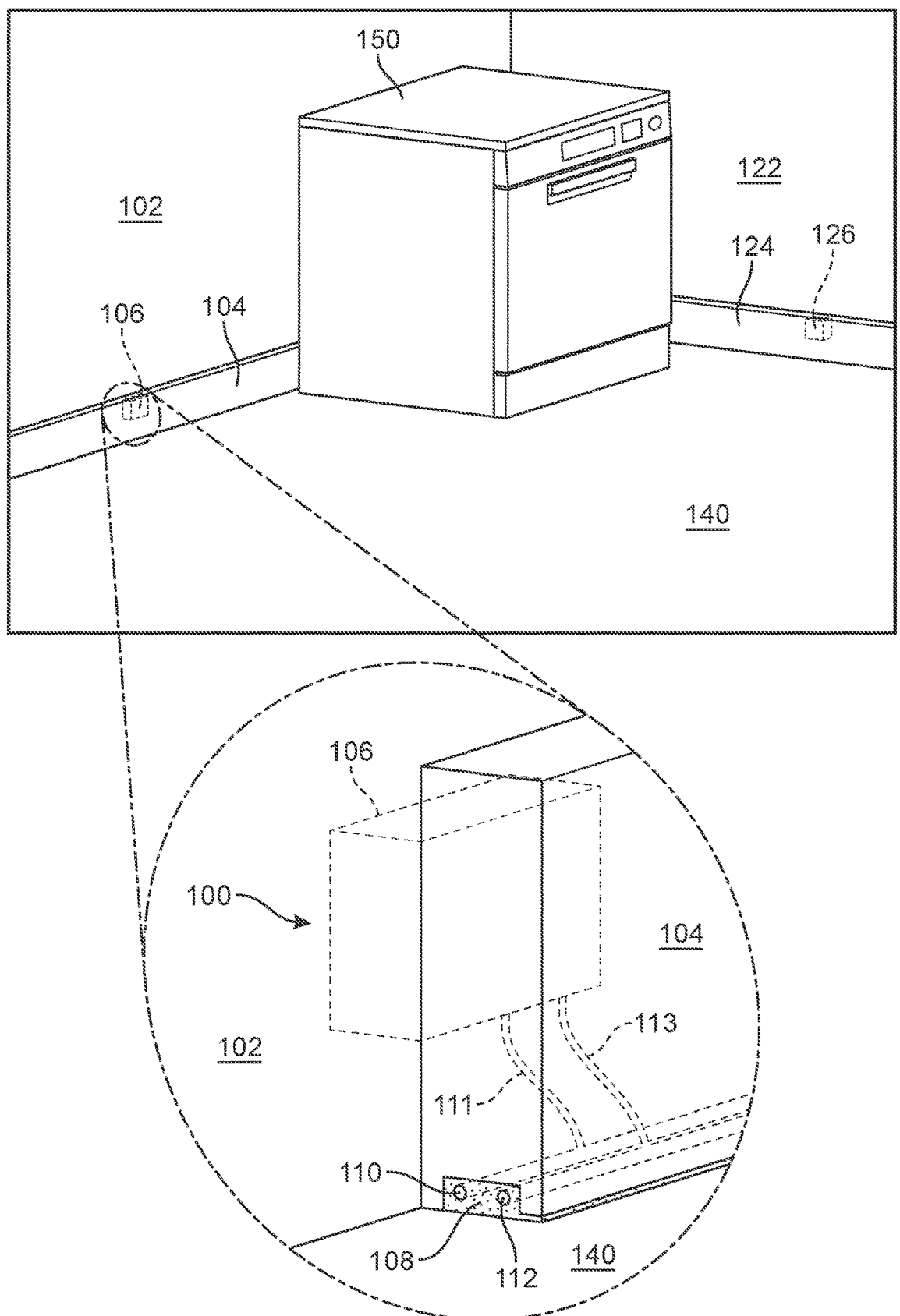
FIG. 1 is a schematic illustration of a baseboard moisture sensing system according to an embodiment.

FIG. 1 is a schematic illustration of a baseboard moisture sensing system according to an embodiment. As shown in FIG. 1, a moisture detection system 100 may be located in a baseboard area of a room. FIG. 1 shows a household room, such as a kitchen, including a dishwasher 150.

As shown in FIG. 1, the system may include a first baseboard 104 and a first moisture detector 106 disposed along a first wall 102. First baseboard 104 may include a first baseboard electrode 110 and a second baseboard electrode 112 that are spaced apart from one another. As also shown in FIG. 1, first moisture detector 106 may be electrically connected to first electrode 110 and second baseboard electrode 112. In particular, first moisture detector 106 may be connected to first baseboard electrode 110 by a first wire 111, and first moisture detector 106 may be connected to second baseboard electrode 112 by a second wire 113.

As also shown in FIG. 1, first electrode 110 and second electrode 112 may be disposed within, and separated by, a moisture absorbing material 108. First moisture detector 106 may be configured to detect whether a circuit is closed by a conductive liquid making simultaneous contact with first electrode 110 and second electrode 112. For example, if enough water (e.g., a leak on floor 140) is absorbed by moisture absorbing material 108, the water will place first electrode 110 and second electrode 112 in electrical connection with one another. First moisture detector 106 may continually produce an electrical potential such that, completion of this circuit across first electrode 110 and second electrode 112 will be detected. When completion of this circuit is detected, first moisture detector 106 may produce an alert in one or more ways, as will be discussed in greater detail below.

In some cases, the room may be furnished with more than one moisture detector and more than one baseboard equipped with electrodes. For example, as shown in FIG. 1, system 100 may include a second baseboard 124 and a second moisture detector 126 associated with a second wall 122. Second baseboard 124 may have the same or substantially the same configuration as first baseboard 104. In addition, second moisture detector 126 may have the same or substantially the same configuration as first moisture detector 106.

First moisture detector 106 is shown as being embedded in, or mounted behind, first wall 102. It will be understood, however, that any of the moisture detectors could be mounted elsewhere, such as on the outside of the wall or on the baseboard itself.

Figure 2:
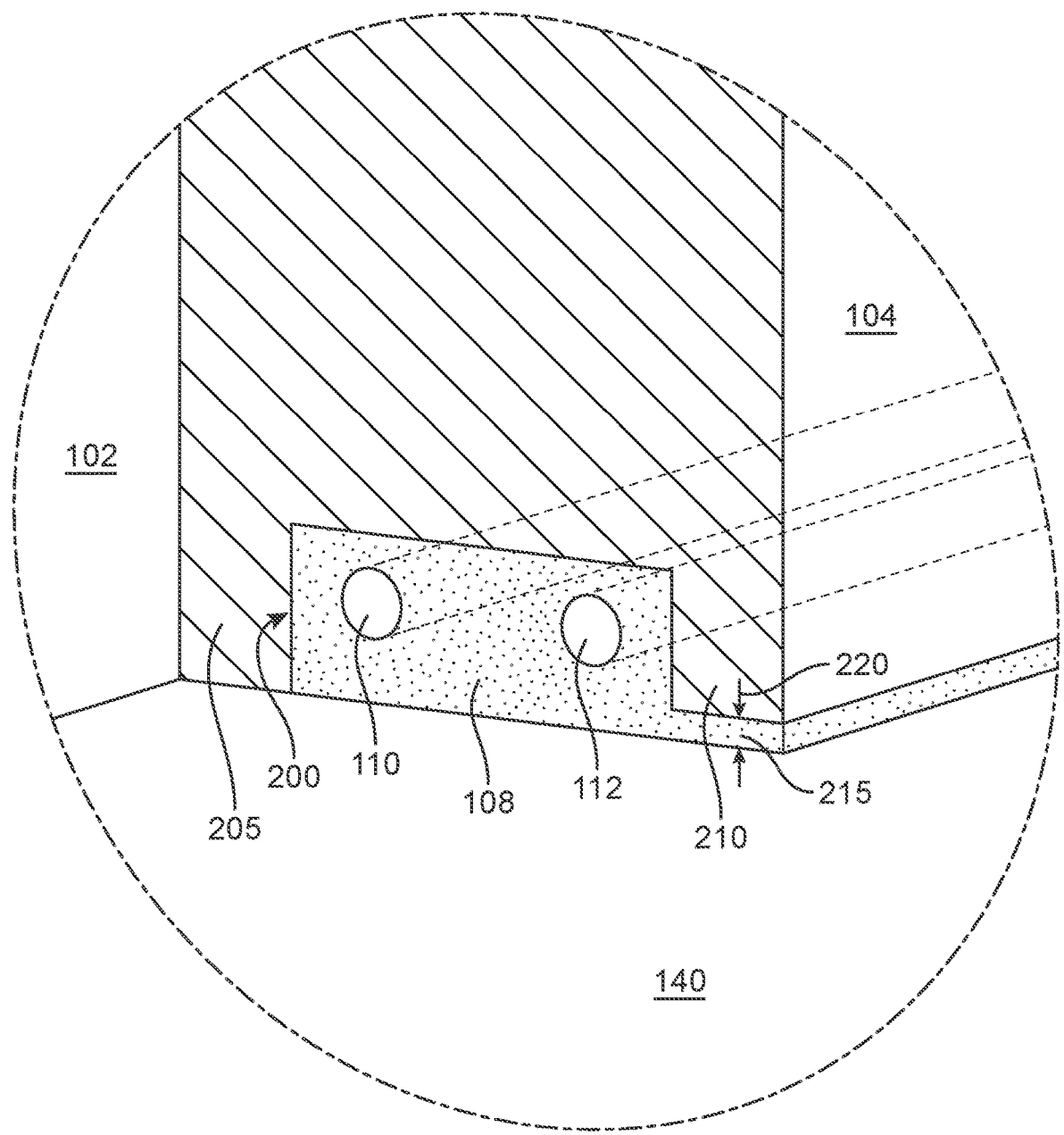
FIG. 2 is a schematic enlarged cut-away cross-sectional view of a baseboard from the system shown in FIG. 1 with electrodes configured for moisture detection.

FIG. 2 is a schematic enlarged cut-away cross-sectional view of a baseboard from the system shown in FIG. 1 with electrodes configured for moisture detection. As shown in FIG. 2, first electrode 110 and second electrode 112 may extend along a length of the baseboard in a recess 200 in a bottom of first baseboard 104. As further shown in FIG. 2, first electrode 110 and second electrode 112 are disposed within, and separated by, moisture absorbing material 108 within recess 200.

Recess 200 may be defined at least in part by a rear portion 205 of baseboard 104 and a front portion 210 of baseboard 104. As shown in FIG. 2, rear portion 205 may extend downward further than front portion 210 such that, when rear portion 205 of baseboard 104 is in contact with floor 140, a gap 220 is defined between front portion 210 of baseboard 104 and floor 140. Further, moisture absorbing material 108 may include a wick portion 215 extending into gap 220 between front portion 210 of baseboard 104 and floor 140.

The moisture absorbing material may be any suitable material to hold liquids in order to establish electrical contact between first electrode 110 and second electrode 112. Accordingly, moisture absorbing material 108 may be a hydrophilic material. In some embodiments, moisture absorbing material 108 may be felt. Felt is a textile material that is produced by matting, condensing and pressing fibers together. Felt can be made of natural fibers such as wool or animal fur, or from synthetic fibers such as petroleum-based acrylic or acrylonitrile or wood pulp-based rayon. Blended fibers are also possible. It will be understood that, in some embodiments, the felt material may be formed of fibers made of a hydrophilic material, and in other embodiments, the felt material may be hydrophilic by virtue of the matting of non-hydrophilic materials against one another. Those having ordinary skill in the art will readily recognize suitable materials to retain liquids as well as wicking liquids in the gap at the front of the baseboard. It will be noted that the moisture absorbing material may not, itself, be an electrically conductive material. That is, the moisture absorbing material must be an electrically insulative material, in order that the circuit between the electrodes is closed only when a conductive liquid infiltrates the moisture absorbing material.

Figure 3:
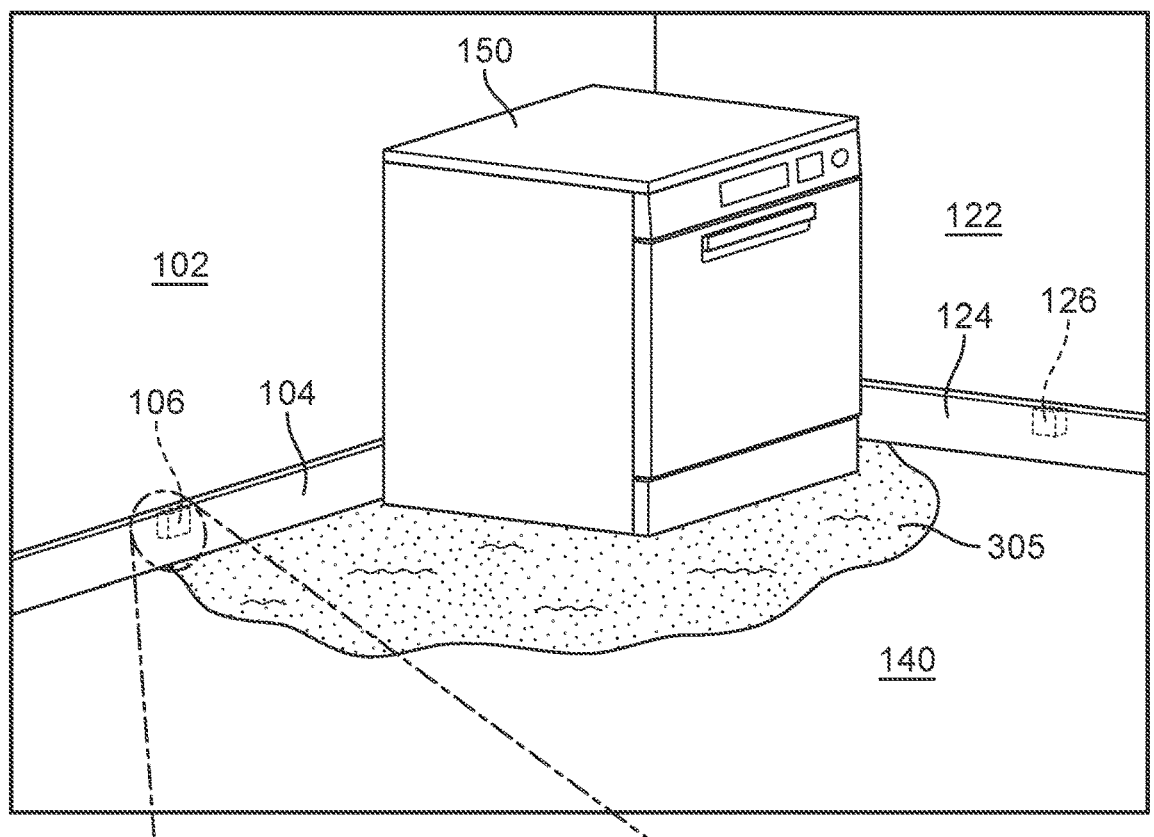
FIG. 3 is a schematic illustration of the system shown in FIG. 1 shown with a puddle on the floor that extends to the baseboard.
Figure 3:
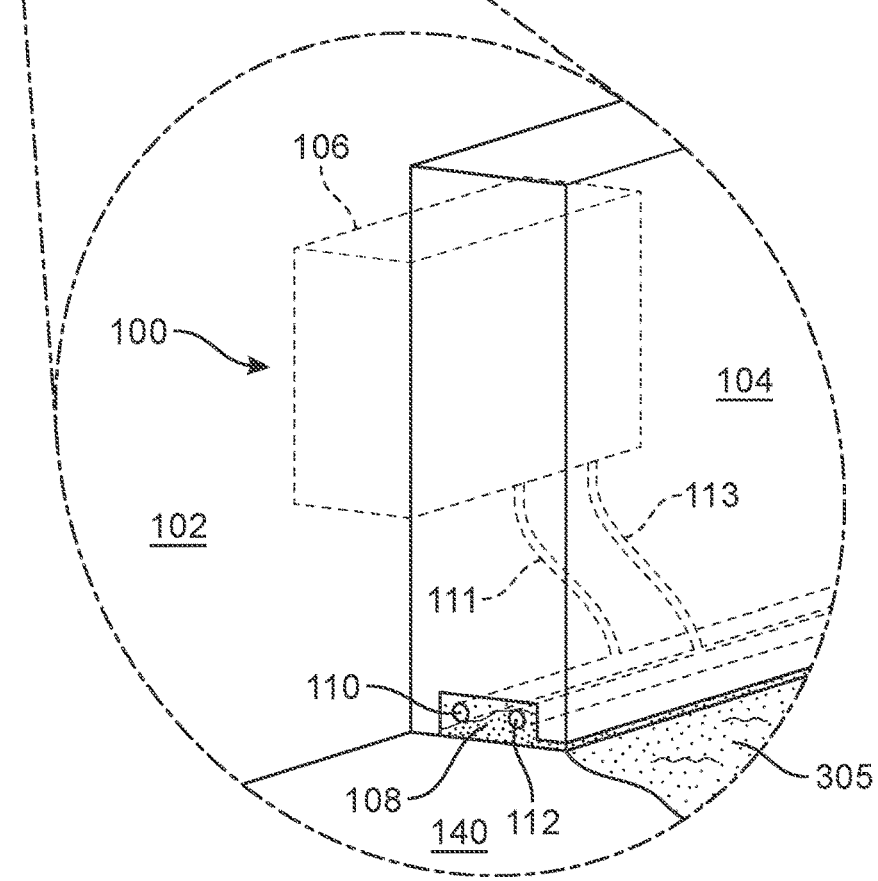

FIG. 3 is a schematic illustration of the system shown in FIG. 1 shown with a puddle 305 on floor 140 that extends from underneath dishwasher 150 to first baseboard 104. As shown in FIG. 3, some of moisture absorbing material 108 has soaked up some of the liquid forming puddle 305.

Figure 4:
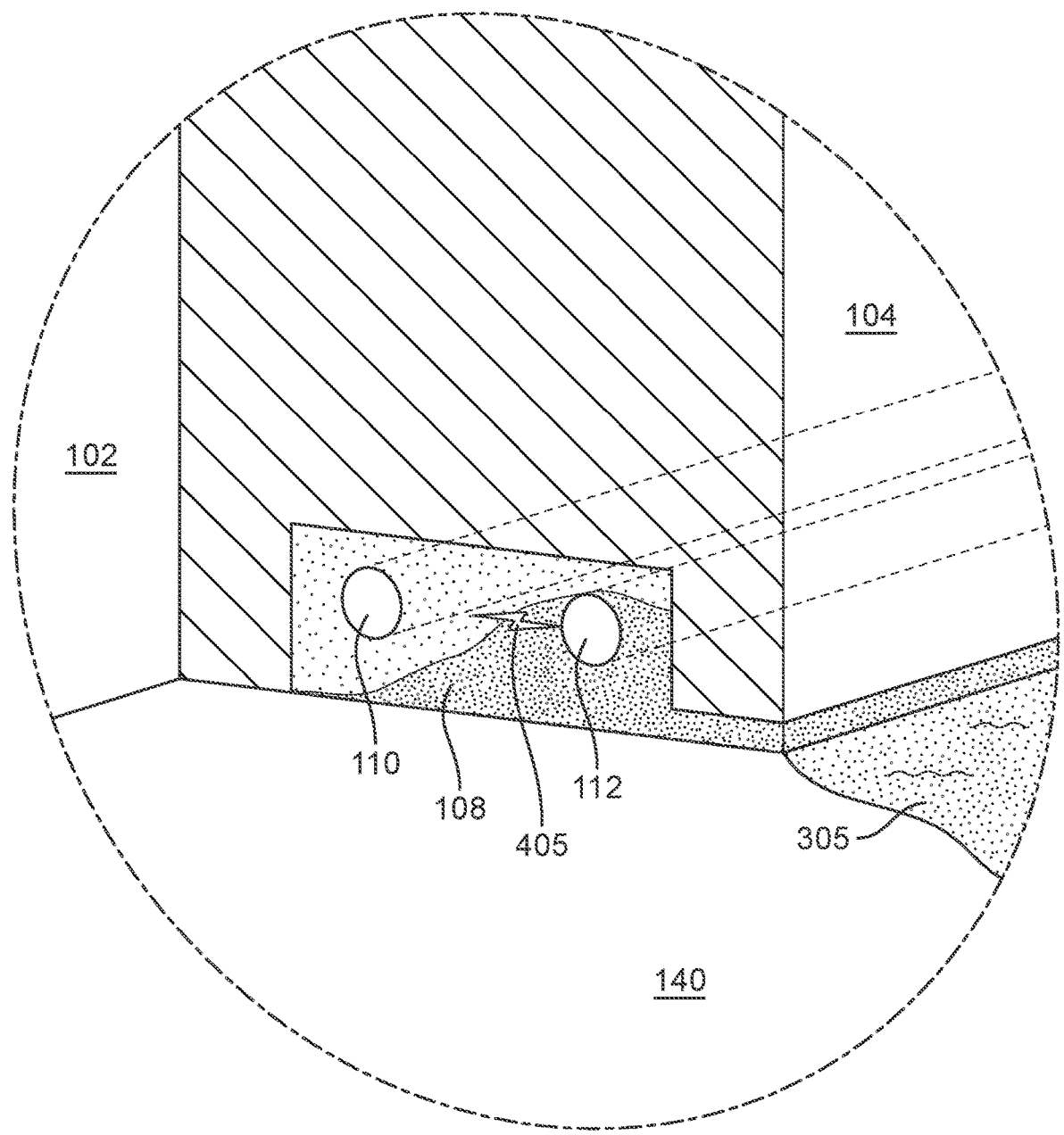
FIG. 4 is a schematic enlarged cut-away cross-sectional view of the baseboard shown in FIG. 2 with liquid absorbed by a portion of a moisture absorbing material surrounding the electrodes in which the liquid only comes into contact with one of the electrodes.

FIG. 4 is a schematic enlarged cut-away cross-sectional view of the baseboard shown in FIGS. 2 and 3 with liquid absorbed by a portion of moisture absorbing material 108 surrounding first electrode 110 and second electrode 112. However, as shown in FIG. 4, not enough liquid has been absorbed by moisture absorbing material 108 to make contact with first electrode 110. That is, the liquid only makes contact with second electrode 112. Accordingly, current 105 flowing through second electrode 112 cannot reach first electrode 110 because there is no electrically conductive material that is simultaneously in contact with both electrodes.

Figure 5:
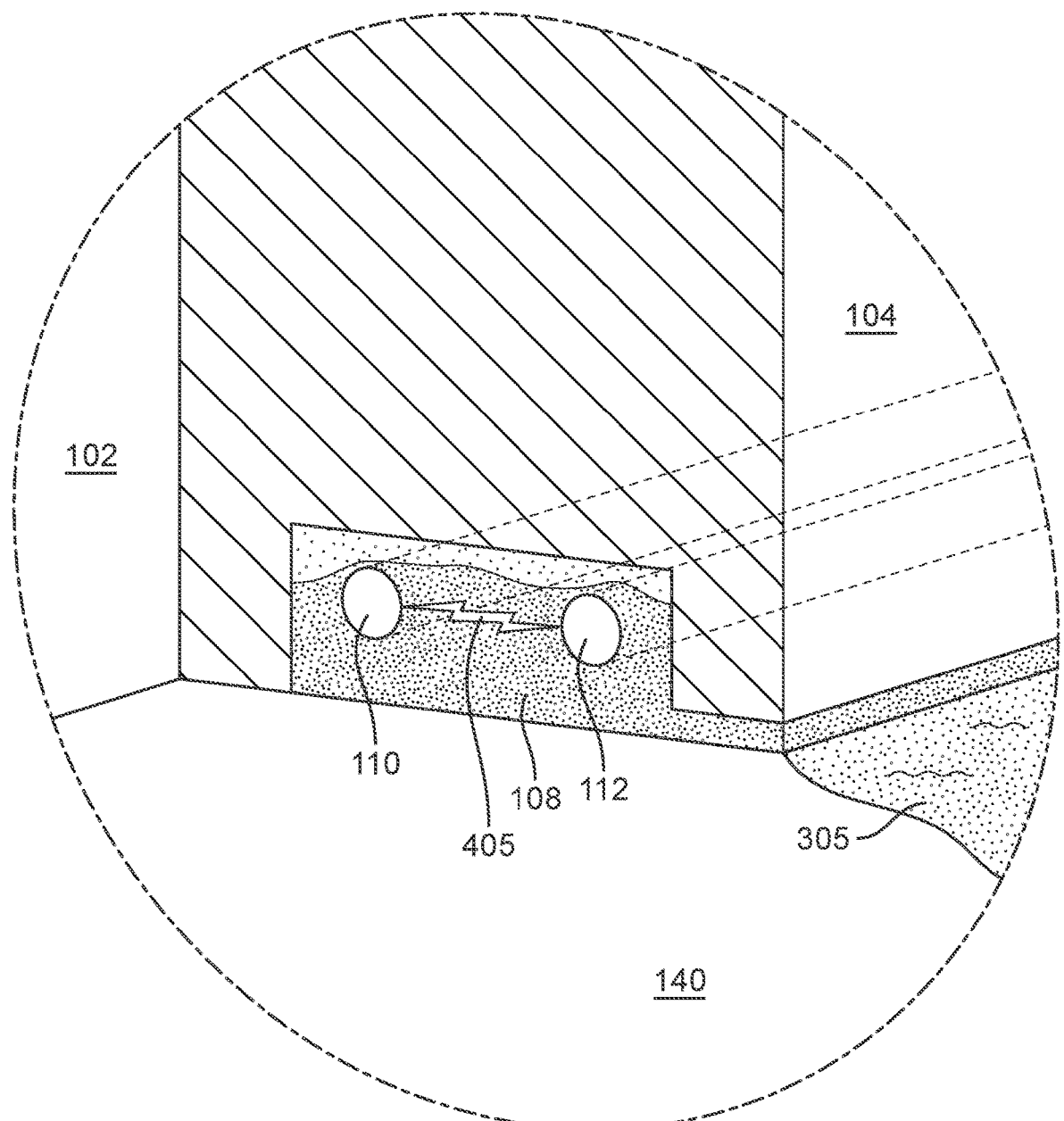
FIG. 5 is a schematic view similar to FIG. 4 but with liquid contacting both electrodes.

FIG. 5 is a schematic view similar to FIG. 4 but with liquid contacting both electrodes. As shown in FIG. 5, liquid surrounds both first electrode 110 and second electrode 112. Accordingly, current 405 can flow between second electrode 112 and first electrode 110. This completes a circuit.

Figure 6:
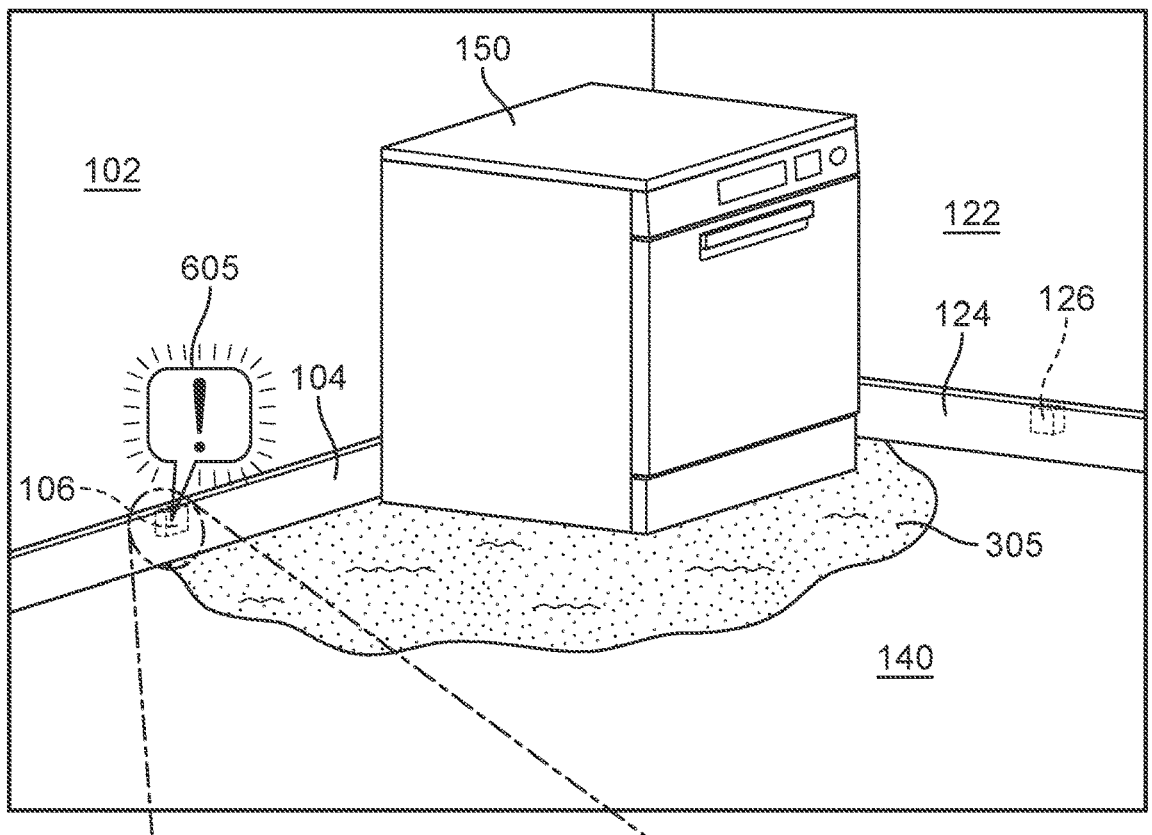
FIG. 6 is a schematic illustration of the system of FIG. 1 illustrating an alert function of the moisture detection system.
Figure 6:
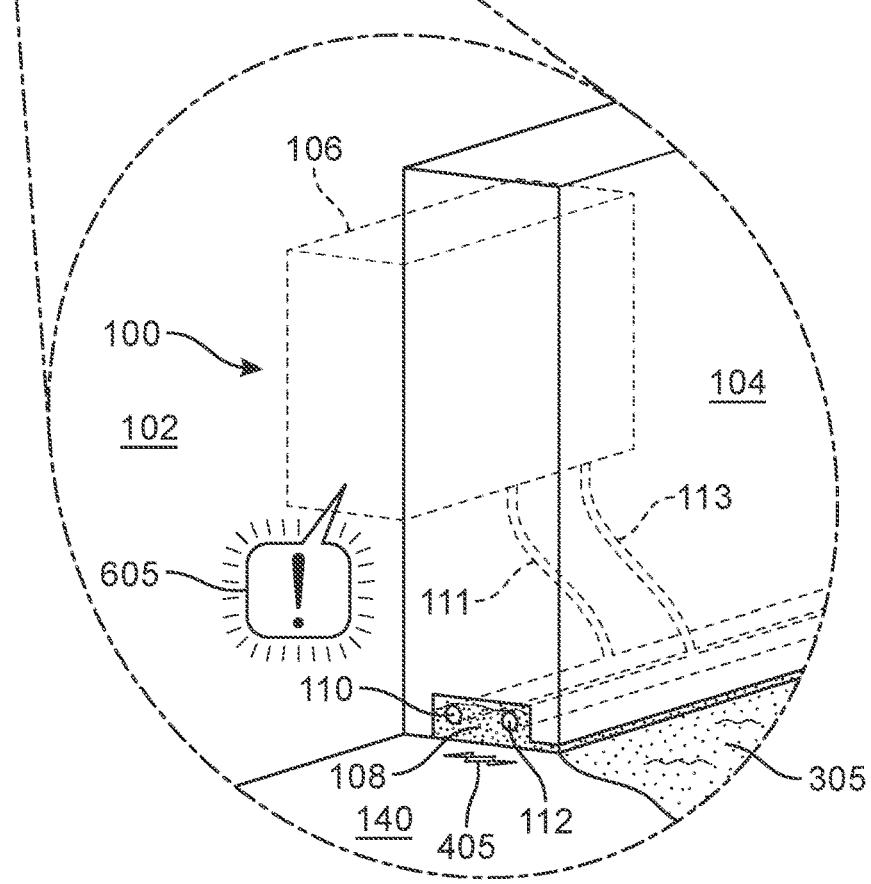

FIG. 6 is a schematic illustration of the system of FIG. 1 illustrating an alert function of the moisture detection system. As shown in FIG. 6, when the circuit is closed by a conductive liquid, such as water, first moisture detector 106 may produce an alert, indicated by an alert symbol 605. This alert may be provided in one or more different forms. In some embodiments, the alert may be audible. In some embodiments, the alert may be visual, such as a blinking light. In some embodiments, moisture detector 106 may send an alert to another device. For example, in some cases, the system may send a message that the homeowner will receive on their personal electronic device (e.g., a smart phone, tablet, computer, etc.), so that they may be alerted to the presence of moisture in their home as soon as possible, even if they are not at home at the time the moisture is detected.

In some embodiments, the system may include a plurality of baseboards arranged about a room of a building, and each baseboard may include a first electrode and a second electrode, and the each baseboard may be associated with at least one moisture detector configured to detect whether a circuit is closed by a conductive liquid making simultaneous contact with the first electrode and the second electrode.

Figure 7:
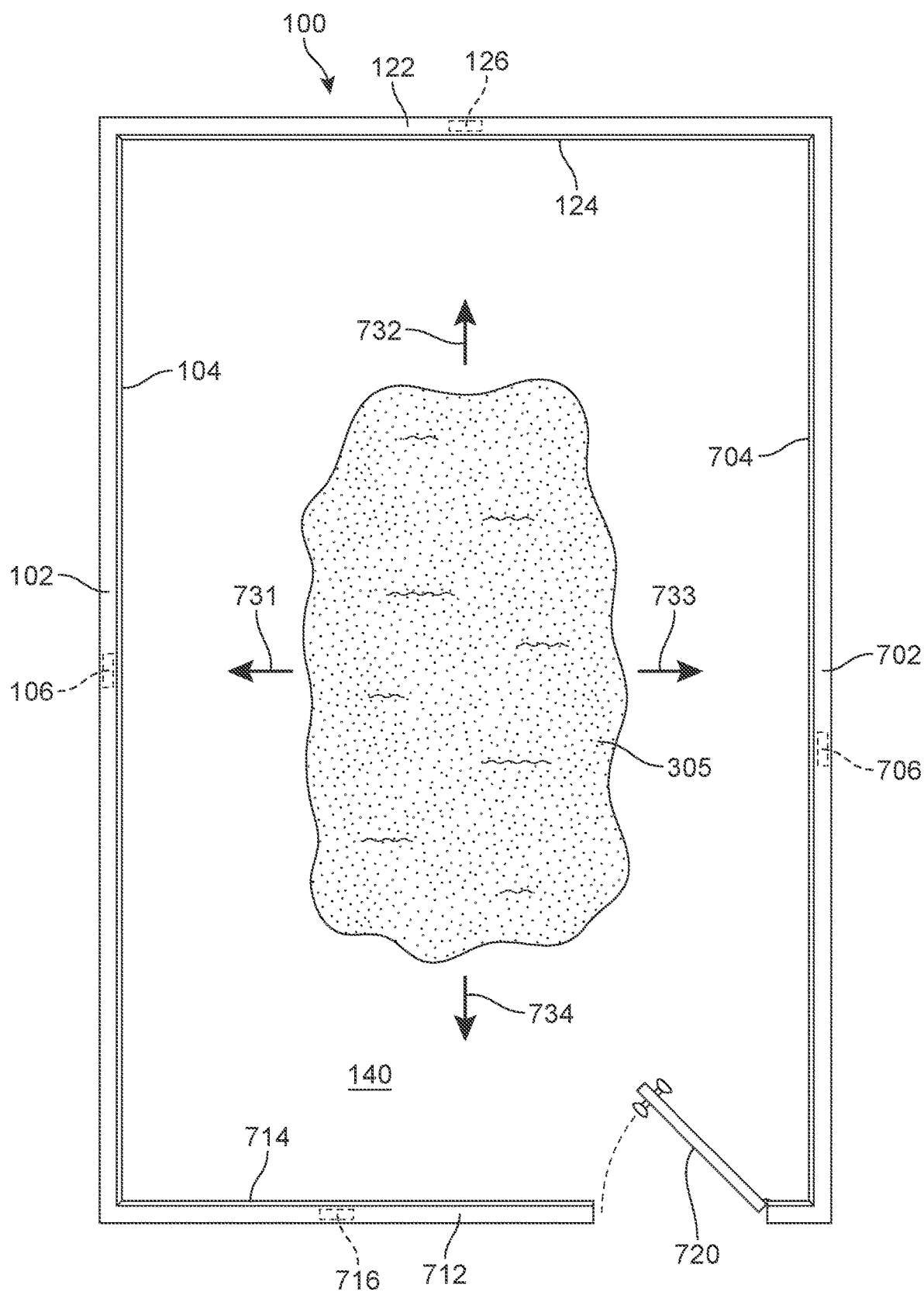
FIG. 7 is a top view of a room equipped with a moisture sensing system.

FIG. 7 is a top view of a room equipped with a moisture sensing system. As shown in FIG. 7, in some embodiments, system 100 may be configured to provide 360 degree detection about the perimeter of the room. As shown in FIG. 7, first wall 102 is equipped with first baseboard 104 and first moisture detector 106. In addition, second wall 122 is equipped with second baseboard 124 and second moisture sensor 126.

In some embodiments, the other walls of the room may be equipped with moisture sensing devices. For example, a third wall 702 may be equipped with a third baseboard 704 and a third moisture detector 706. In addition, a fourth wall 712 may be equipped with a fourth baseboard 714 and a fourth moisture detector 716. In addition, for reference, fourth wall 712 is shown including a door 720. These additional baseboards and moisture detectors may be configured the same or substantially the same as the other baseboards and moisture detectors discussed above.

As shown in FIG. 7, puddle 305 may proceed in any direction and the presence of this liquid will be detected by system 100. That is, if puddle 305 flows in a first direction 731 and it contacts first baseboard 104 at any point along its length, it will be absorbed by the moisture absorbing material in the recess at the bottom of first baseboard 104 and ultimately will trip moisture detector 106. Similarly, if puddle 305 flows in a second direction 732 toward second wall 122, it will eventually trip second moisture detector 126. If puddle 305 flows in a third direction 733 toward third wall 702, it will eventually trip third moisture detector 706. If puddle 305 flows in a fourth direction 734 toward fourth wall 712, it will eventually trip fourth moisture detector 716.

With such a configuration, only a single moisture detector is needed on each wall. However, in some embodiments, if the electrodes in abutting baseboards (e.g., at corners) are in electrical contact with one another, then a single moisture detector may be used to detect moisture about the entire room.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:
1. A moisture detection system, comprising:
a baseboard configured to be mounted on a lower portion of a wall of a building structure, the baseboard including a bottom configured to be disposed adjacent a floor when the baseboard is mounted on the lower portion of the wall, the baseboard further including a first electrode and a second electrode; and
a moisture detector configured to detect whether a circuit is closed by a conductive liquid making simultaneous contact with the first electrode and the second electrode;
wherein the first electrode and the second electrode extend along a length of the baseboard in a recess in the bottom of the baseboard.
2. The system according to claim 1, wherein the first electrode and the second electrode are disposed within, and separated by, a moisture absorbing material within the recess.
3. The system according to claim 2, wherein the recess is defined at least in part by a rear portion of the baseboard and a front portion of the baseboard;
wherein the rear portion of the baseboard extends downward further than the front portion such that, when the rear portion of the baseboard is in contact with a floor, a gap is defined between the front portion of the baseboard and the floor.
4. The system according to claim 3,
wherein the moisture absorbing material includes a wick portion extending into the gap between the front portion of the baseboard and the floor.
5. The system according to claim 2, wherein the moisture absorbing material is a hydrophilic material.
6. The system according to claim 5, wherein the moisture absorbing material is felt.
7. The system according to claim 1, wherein the moisture detector is configured to produce an alert when moisture is detected.
8. A baseboard for a moisture detection system, the baseboard being configured to be mounted on a lower portion of a wall of a building structure and comprising:
a bottom configured to be disposed adjacent a floor when the baseboard is mounted on the lower portion of the wall;
a first electrode and a second electrode;
wherein the first electrode and the second electrode extend along a length of the baseboard in a recess in the bottom of the baseboard; and
wherein the first electrode and the second electrode are disposed within, and separated by, a moisture absorbing material within the recess.
9. The baseboard according to claim 8, wherein the recess is defined at least in part by a rear portion of the baseboard and a front portion of the baseboard;
wherein the rear portion of the baseboard extends downward further than the front portion such that, when the rear portion of the baseboard is in contact with a floor, a gap is defined between the front portion of the baseboard and the floor.
10. The baseboard according to claim 9, wherein the moisture absorbing material includes a wick portion extending into the gap between the front portion of the baseboard and the floor.
11. The baseboard according to claim 8, wherein the moisture absorbing material is a hydrophilic material.
12. The baseboard according to claim 11, wherein the moisture absorbing material is felt.
13. A moisture detection system, comprising:
a plurality of baseboards arranged about a room of a building along lower portions of walls of the building;
each baseboard including a bottom configured to be disposed adjacent a floor when the baseboard is mounted on the lower portion of the wall, each baseboard further including a first electrode and a second electrode, wherein both the first electrode and the second electrode both extend along a length of the baseboard in a recess in the bottom of the baseboard; and
at least one moisture detector configured to detect whether a circuit is closed by a conductive liquid making simultaneous contact with the first electrode and the second electrode.
14. The system according to claim 13, wherein the first electrode and the second electrode are disposed within, and separated by, a moisture absorbing material within the recess.
15. The system according to claim 14, wherein the recess is defined at least in part by a rear portion of the baseboard and a front portion of the baseboard;
wherein the rear portion of the baseboard extends downward further than the front portion such that, when the rear portion of the baseboard is in contact with a floor, a gap is defined between the front portion of the baseboard and the floor.
16. The system according to claim 15,
wherein the moisture absorbing material includes a wick portion extending into the gap between the front portion of the baseboard and the floor.
17. The system according to claim 13, wherein the at least one moisture detector is configured to produce an alert when moisture is detected.
18. The system according to claim 13, wherein the system includes multiple moisture detectors with a separate moisture detector being associated with each baseboard.
19. The system according to claim 13, wherein the electrodes of the respective baseboards are in electrical contact with one another; and
wherein the system includes a single moisture detector configured to detect whether a circuit is closed by a conductive liquid making simultaneous contact with the first electrode and the second electrode of any of the baseboards.

20. The system according to claim 13, wherein the electrodes of the respective baseboards are independent of one another; and
  wherein the system includes a moisture detector associated with each baseboard and configured to detect whether a circuit is closed by a conductive liquid making simultaneous contact with the first electrode and the second electrode of each respective baseboard.

\* \* \* \* \*